United States Patent [19]
Blevin et al.

[11] Patent Number: 5,502,438
[45] Date of Patent: Mar. 26, 1996

[54] ADDRESS MANAGEMENT FOR REMOTE TERMINALS IN DIGITAL LOOP TRANSMISSION SYSTEMS

[75] Inventors: John H. Blevin, Scotrun, Pa.; Robert W. DeMarco, Hanover Township, Morris County, N.J.; Peter A. A. Dempsey, Morris Plains, N.J.; Raphael Jimenez, Randolph Township, Morris County, N.J.; Roger H. Levy, Berkeley Heights Township, Union County, N.J.

[73] Assignee: AT&T Corp., Murray Hill, N.J.

[21] Appl. No.: 49,957

[22] Filed: Apr. 20, 1993

Related U.S. Application Data

[63] Continuation of Ser. No. 636,962, Jan. 2, 1991, abandoned.

[51] Int. Cl.⁶ .................................................. H04Q 1/00
[52] U.S. Cl. ........................... 340/825.52; 340/825.07; 340/825.53
[58] Field of Search ....................... 340/825.02, 825.05, 340/825.07, 825.08, 825.5, 825.52, 825.53, 825.54; 370/85.1, 85.2, 85.6, 85.7, 85.8, 92, 94.1, 94.2, 94.3, 93, 95.2

[56] References Cited

U.S. PATENT DOCUMENTS

| | | | |
|---|---|---|---|
| 4,071,908 | 1/1978 | Brophy et al. | 340/825.02 |
| 4,638,313 | 1/1987 | Sherwood, Jr. et al. | 340/825.52 |
| 4,689,786 | 8/1987 | Sidhu et al. | 320/92 |
| 4,730,251 | 3/1988 | Aakre et al. | 395/325 |
| 4,947,162 | 8/1990 | Kimura | 340/825.08 |

OTHER PUBLICATIONS

*Honeywell Computer Journal*, vol. 5, (1971), "A Cyclic Redundancy Checking (CRC) Algorithm," by A. B. Marton and T. K. Frambs, pp. 140–142.

*Primary Examiner*—John K. Peng
*Assistant Examiner*—Andrew Hill
*Attorney, Agent, or Firm*—Lester H. Birnbaum

[57] ABSTRACT

Disclosed is a method and apparatus for identifying remote terminals which are networked in a digital loop transmission system. A Site Interface Unit (SIU) at one of the remote terminals acts as a master. The Bank Controller Unit (BCU) at each remote terminal calculates a 16-bit number based on its 60-byte serial number. A binary search is then performed by the SIU to determine the calculated number of each BCU, and an address is assigned to each remote terminal by the SIU. Any conflicts in the numbers initially calculated are resolved by transmission of the full 60-byte serial number.

16 Claims, 7 Drawing Sheets

ADDRESS MANAGEMENT FOR REMOTE TERMINALS IN DIGITAL LOOP TRANSMISSION SYSTEMS

This application is a continuation of application Ser. No. 07/636,962, filed on Jan. 2, 1991, abandoned.

BACKGROUND OF THE INVENTION

This invention relates to digital loop transmission systems, and, in particular, to a means for managing a plurality of remote terminals which are networked in said systems.

Digital loop transmission systems, such as Subscriber Loop Carrier (SLC®) Systems, involve transmission of digital information between a central office and a number of remote terminals, and between the remote terminals and subscribers. Each remote terminal site includes a Site Interface Unit (SIU) which provides a data link between the central office and remote terminal, and each remote terminal includes a Bank Controller Unit (BCU) for controlling the various circuits of the terminal.

Future systems will include advanced capabilities such as inventory control of channel units, downloading of software from the central office, and special monitoring of remote terminal functions. Many of these new features will require fairly complex and expensive circuitry in the SIU to provide an appropriate link with the central office. It is, therefore, desirable to combine a plurality of remote terminals in a local area network so that the number of links to the central office is reduced. One problem with such an approach, however, is that bandwidth and power limitations preclude standard collision detection in the network. Consequently, some other means is needed to identify each remote terminal and thereby manage communication among the various remote terminals.

In other types of communications systems, it has been proposed that each module can derive a number from the first four bits of its serial number and use that number as a count to determine when to request an address from the primary station. The primary station will then assign an address to the module. The module and primary station will also transmit the module serial number for purposes of verification (see U.S. Pat. No. 4,638,313 issued to Sherwood, Jr., et al).

It is an object of the invention to provide a means for managing a network of terminals including assigning addresses thereto.

SUMMARY OF THE INVENTION

This and other objects are achieved in accordance with the invention. In a digital loop transmission system including a local area network comprising a plurality of remote terminals, each terminal having a unique serial number, and at least one master circuit in one of the terminals, the invention is a method for assigning addresses to the terminals. A number is calculated for each of the terminals based on that terminal's unique serial number. A binary search is performed by the master circuit to determine the calculated number of each terminal. The master circuit then assigns to each terminal a unique address which is different from the calculated number.

BRIEF DESCRIPTION OF THE DRAWING

These and other features of the invention are delineated in detail in the following description. In the drawing.

DETAILED DESCRIPTION

Figure 1:
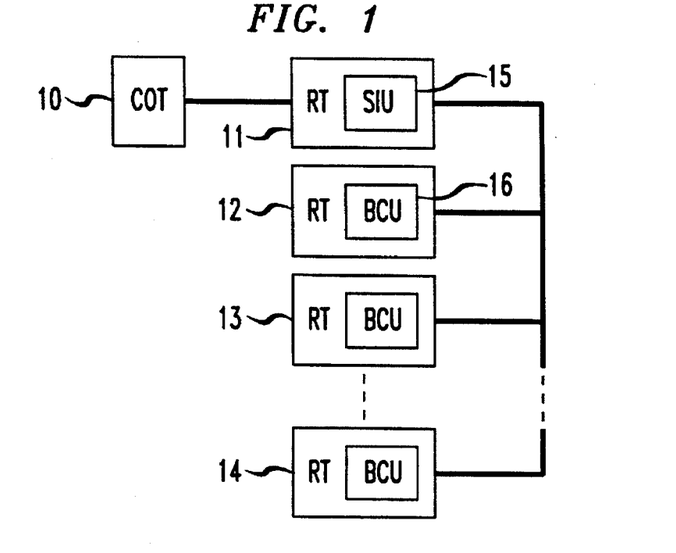
FIG. 1 is a block diagram of a typical digital loop transmission system incorporating the invention.

FIG. 1 illustrates a portion of a typical digital loop transmission system which utilizes the present invention. A data link is provided between a Central Office Terminal (COT), 10, and a first Remote Terminal (RT), 11, through a Site Interface Unit (SIU), 15, included in that terminal. Communication is provided between the first remote terminal and a plurality of other remote terminals 12–14 to form a Local Area Network (LAN). Each remote terminal includes a Bank Controller Unit (BCU), e.g., 16, for controlling various functions of the terminal.

Figure 2:
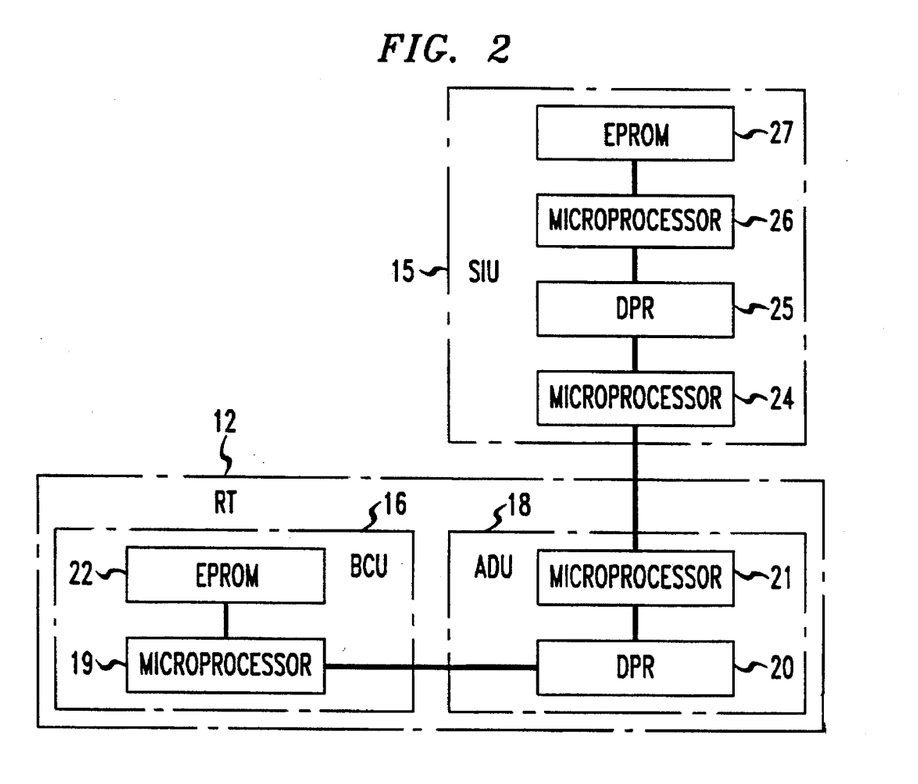
FIG. 2 is a block diagram illustrating further features of a remote terminal in the system of FIG. 1.

A typical RT is illustrated in more detail in FIG. 2. It will be noted that the RT, 12, typically includes a pair of circuit cards, one designated the Bank Controller Unit (BCU), 16, and the other designated the Alarm Display Unit (ADU), 18. The BCU and ADU circuits each include a microprocessor, 19 and 21, respectively. The BCU also includes an EPROM 22. The ADU circuit also includes a Dual Port RAM (DPR) chip, 20. The SIU includes a pair of microprocessors, 24 and 26, with a Dual Port RAM 25, as well as an EPROM 27.

Figure 3:
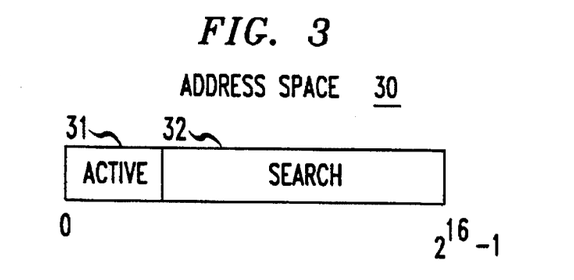
FIG. 3 is a block illustration of an address space in accordance with an embodiment of the invention.

In accordance with the invention, the SIU, 15, will act as a master and the BCUs, e.g., 16, will act as slaves in the address management of the remote terminals which are part of the network. Each remote terminal, 12–14, already possesses a unique 60-byte serial number, herein referred to as the "unique block". From this unique block, each BCU will calculate a number, preferably 16-bits in length. In this particular example, a standard CRC-16 calculation is performed, but other methods may be used (see, for example, "A CRC Algorithm" by A. B. Marton and T. K. Frames; *Honeywell Computer Journal*, Vol 5, No. 3, 1971, pp. 140–142). The total number of possible addresses is $2^{16}$ and is represented by the block, 30, labeled "Address Space" in FIG. 3. The address space is divided into two pans, an active space 31 and a search space 32. Typically, the first 256 address values are reserved for the active space, while the search space contains the remaining values. The search space includes all the possible calculated values of the remote terminals. (If a BCU happens to calculate a value that falls in the active space, it will add 256 to the calculated value to bring it into the search space.)

The SIU will then do a binary search of the calculated address values hereinafter referred to as Data Link Addresses (DLAs). Once a remote terminal's Data Link Address is determined by the SIU, the latter will assign an address, in the active space to that terminal. In the event that two or more terminals have calculated the same number, the SIU will utilize the unique block of the terminals to resolve any conflicts.

Figure 4:
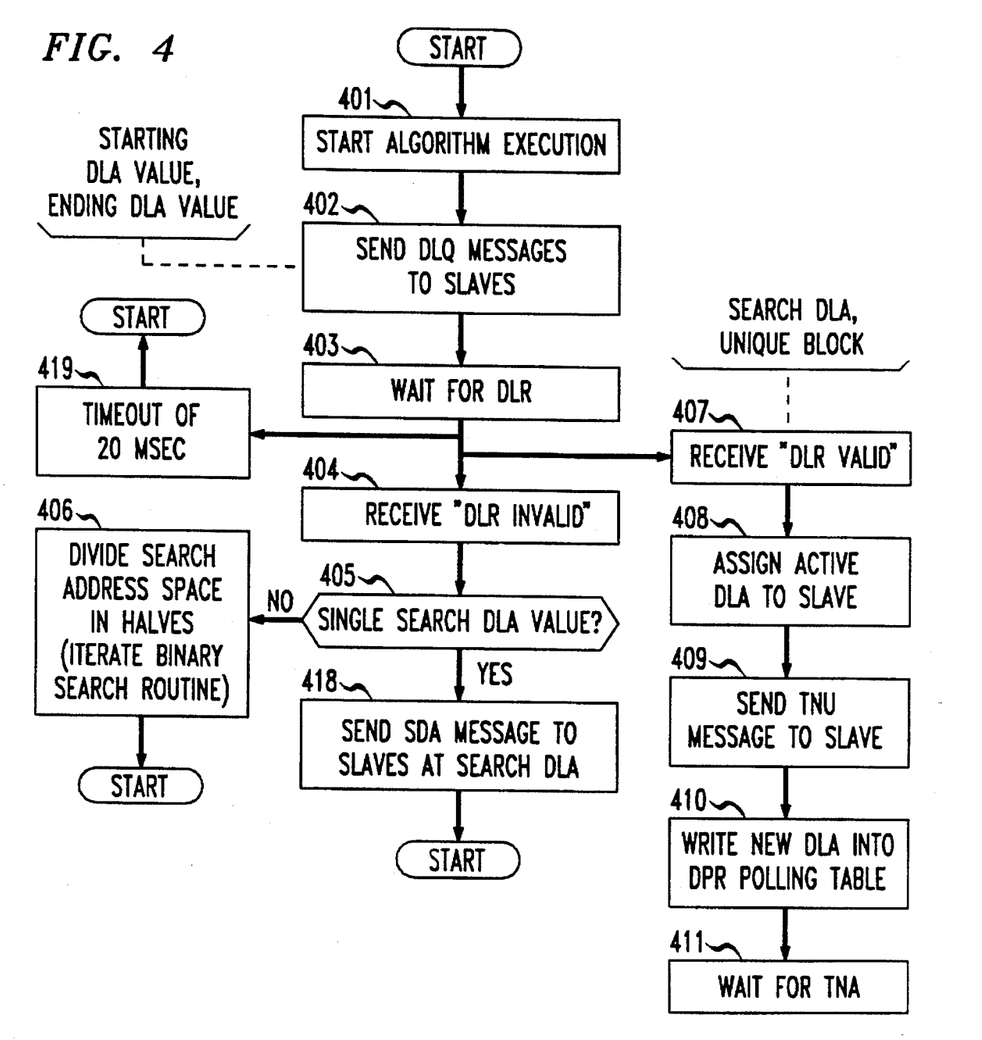
FIGS. 4–10 are flow diagrams illustrating the invention in accordance with an embodiment.

The invention will now be described in more detail with reference to the flow diagrams of FIGS. 4–10. FIG. 4 shows the procedures performed by microprocessor 26 of the SIU (15 of FIG. 1). The start of the algorithm execution is designated by box 401. In accordance with step 402, the SIU sends a Data Link Address Query (DLQ) to all the Remote Terminal BCUs (slaves) which are part of the network. The query is made as to whether there are any Data Link Addresses (DLAs) within a starting and ending value, which, initially, will be all values within the search space (32 of FIG. 3). The SIU then waits for a Data Link Reply (DLR) from the BCUs as indicated at block 403.

If there is more than one address in the DLA range, which should be the case for the initial try, the SIU will receive a garbled response which will be detected by the SIU microprocessor 24, and a "DLR Invalid" message as indicated by block 404 will be received by the SIU microprocessor 26. As indicated by decision box 405, the SIU will inquire as to whether there is only one possible value in the transmitted DLA range, which, of course, will not be the case for the initial search. As shown in block 406, the SIU will then divide the search space in halves and start again with these new DLA ranges at step 402. That is, the SIU will execute an iterative binary search routine until all DLAs are discovered.

Thus, at some point in the routine, the SIU will receive a "DLR Valid" message as indicated at block 407 which indicates only a single address is present in the search space. In addition to the DLA, the slave BCU will also send its unique block for verification to guard against the possibility that more than one slave has the same DLA but the SIU received a message from only one of them. As shown in block 408, the SIU then assigns a DLA in the active space (31 of FIG. 3) to the slave BCU which responded with the "DLR Valid" message. This is followed, as shown by block 409, by the SIU sending a Turn Up (TNU) message to the slave to which it assigned the active DLA, as well as sending the unique block it had received in step 407 to verify that the proper slave will be turned on. As indicated by block 410, the active DLA is written into the Dual Port Ram (DPR), 20 of FIG. 2, by the SIU, and the SIU waits for a Turn Up Acknowledge (TNA) message as shown by block 411.

Figure 5:
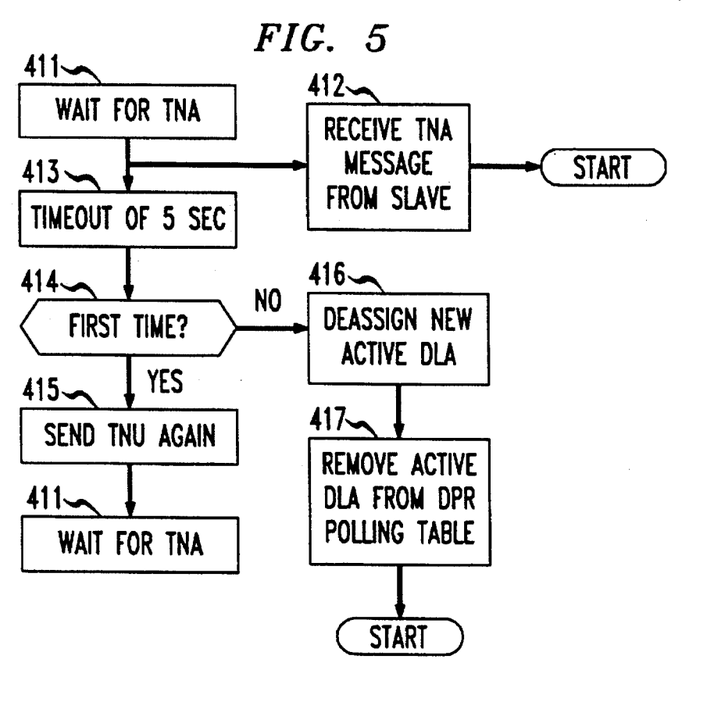

FIG. 5 continues the flow diagram for the SIU. If the SIU receives the TNA message as indicated by block 412, the procedure is repeated to locate and assign an address to another slave. As indicated by block 413, the SIU allows a time of 5 sec to receive a TNA message from the slave. At the end of 5 see, if no message is received, an inquiry is made at block 414 as to whether this is the first request for a TNA. If it is, another Turn Up message is sent (block 415) and the SIU will again wait for a Turn Up Acknowledge signal. If, again, no message is received after 5 sec, the SIU will de-assign the address previously assigned to the slave, as shown by block 416, and remove the address from the Dual Port RAM, as indicated by block 417. The search will then continue for other terminal addresses. During some later search, the BCU which failed to send the TNA message will be turned up.

Returning to FIG. 4, it will be appreciated that the search for addresses will be repeated until there is a single possible address left in the search space. If a "DLR Invalid" message is still received (block 404) and the SIU determines that there is only one address left (block 405), the SIU concludes that two slaves have computed the same DLA. In such cases, the SIU sends a "Select New Data Link Address" message (SDA) to the slaves (block 418) instructing the slaves to generate new DLAs. The process of discovering the search addresses and assigning new addresses then continues.

Once the SIU receives no response for 20 msec following a DLQ message (block 419), the SIU concludes there are no more terminals within the search field.

Figure 6:
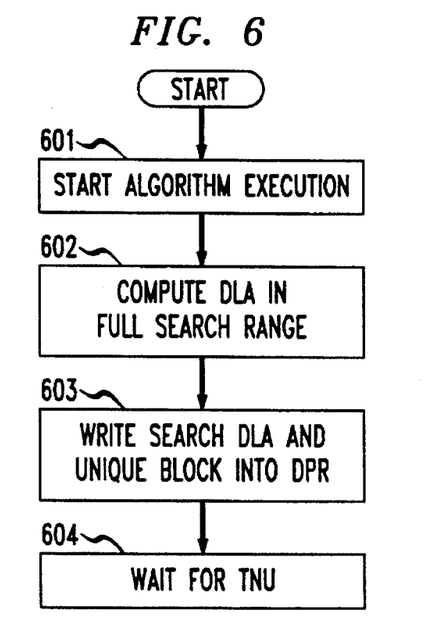
Figure 7:
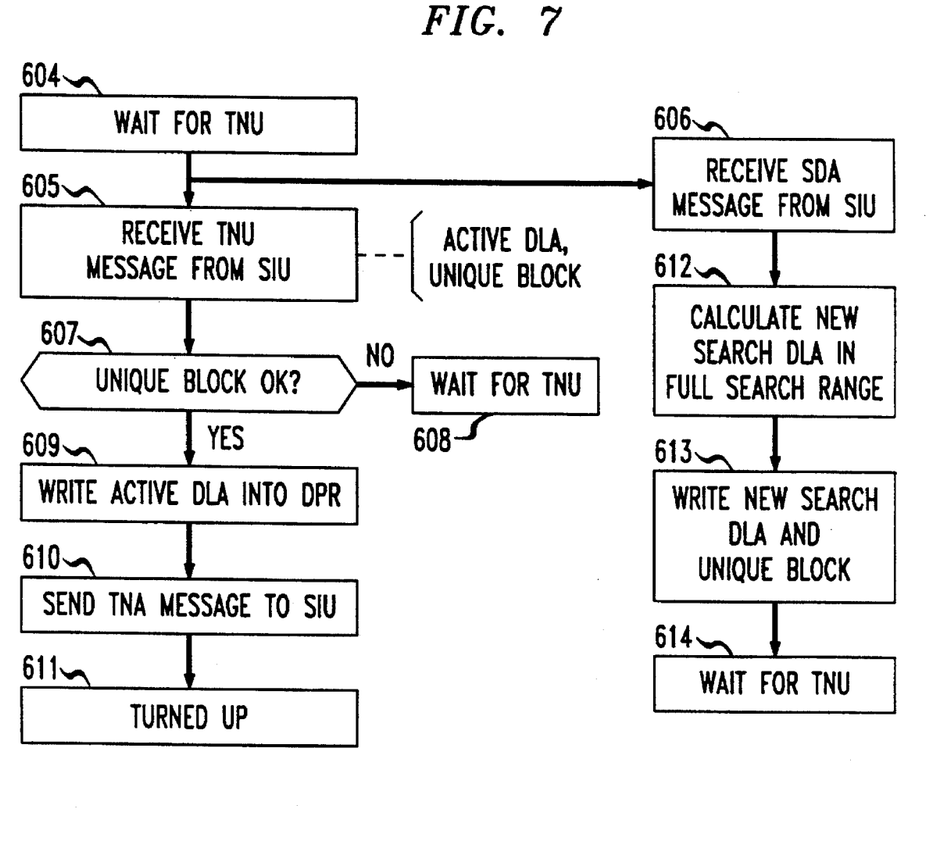
Figure 8:
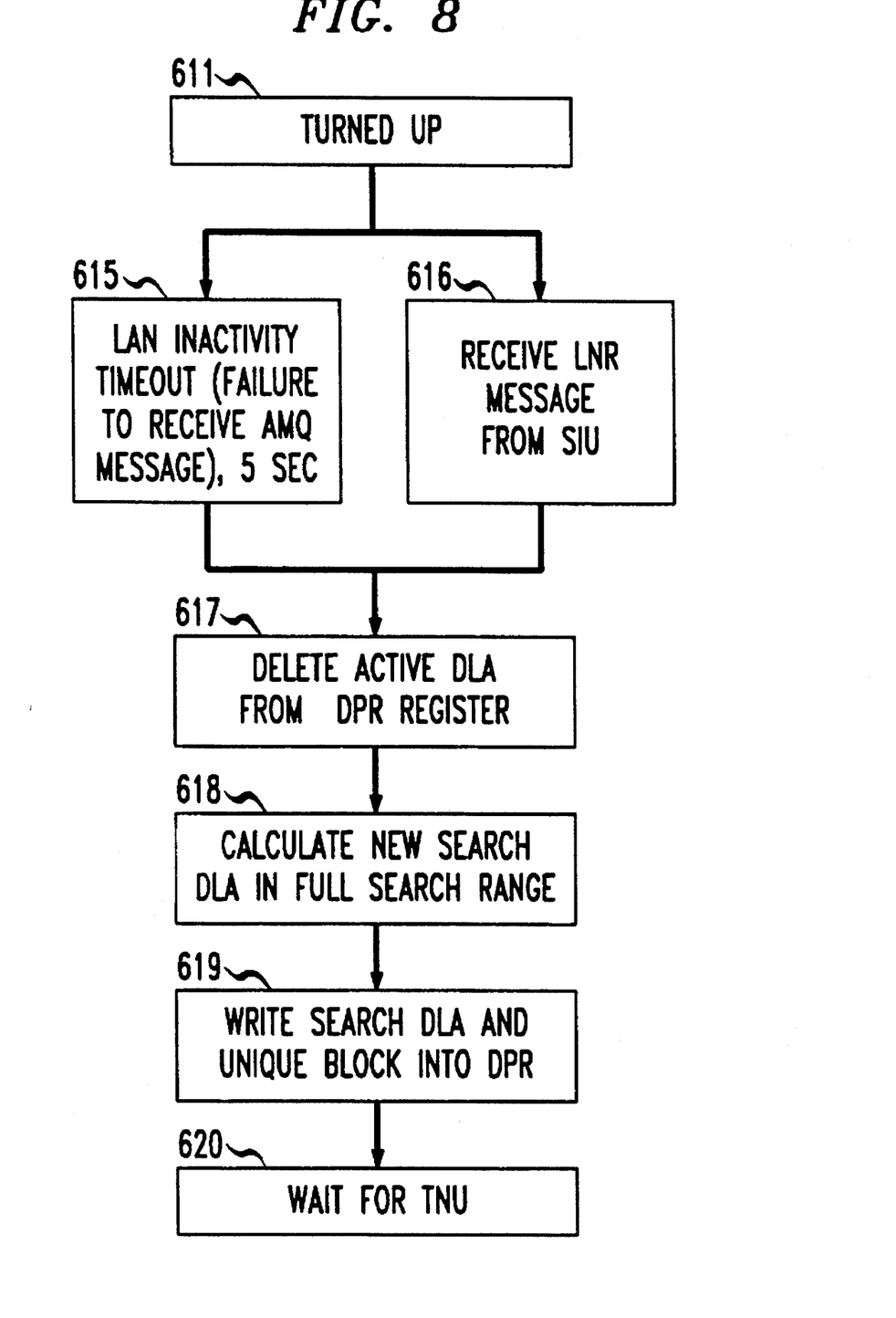

FIGS. 6–8 illustrate the steps executed by the microprocessor (19 of FIG. 2) which is part of the BCU. The program for these steps is stored in EPROM 22. The start of the algorithm is represented by block 601. The microprocessor then computes the Data Link Address (DLA) in the search space (32 of FIG. 3) as indicated by block 602. In this example, a CRC-16 calculation is employed, but other methods may be used. The resulting address, designated "Search DLA" in block 603, is written into the Dual Port RAM (DPR), 20 of FIG. 2, located in the Alarm Display Unit, for access by the microprocessor, 21, in the ADU. The unique block of the BCU is also written into the DPR. The BCU then waits for a Turn Up (TNU) message from the SIU as indicated by block 604.

Continuing in FIG. 7, once the DLA is found by the SIU, the BCU will receive from the SIU either a Turn Up Message (block 605) or a request for a new Search Address (SDA) message (block 606). Assuming a TNU message is received (block 605), the BCU will also receive an active DLA assigned by the SIU and the unique block that the SIU had previously received in its search (see block 407 of FIG. 4). In block 607, the BCU determines if the unique block it received matches its unique block. If not, it waits for a later TNU (block 608). If the unique blocks match, according to block 609, the active DLA is written into the DPR (20 of FIG. 2) which is part of the ADU. A Turn Up Acknowledge (TNA) message is then sent to the SIU (block 610) and the remote terminal including this BCU is turned up (block 611 ). If an SDA message is received (block 606), the microprocessor will calculate a new search DLA in the full search space (block 612). A CRC-16 calculation will again be performed. However, this time, rather than using n bytes of the serial number (where n=60 in this example), the calculation is performed over n-1 bytes by ignoring the first byte of the serial number. (Subsequent calculations will continue to drop the first byte of the serial number used in the previous calculation until a distinct search DLA is finally achieved.) As shown in block 613, a new search DLA along with the unique block of the BCU are written into the DPR. The slave then waits for a TNU message (block 614) when the SIU uncovers the new address.

As further illustrated in FIG. 8, the BCU, once turned up, will remain so until it receives one of two messages. In the event that the BCU fails to receive an audit message (AMQ), it will declare a timeout of 5 sec as shown in block 615. Alternatively, the slave may receive a LAN Reset (LNR) message from the SIU (block 616). In either case, the microprocessor (19) will delete the active DLA from the DPR (20) as shown in block 617, and calculate a new search DLA in the search field as illustrated by block 618. This new search DLA, along with the unique block of the BCU are then written into the DPR for access by the microprocessor 21 (block 619). The slave then waits for a Turn Up (TNU) message (block 620) when the SIU uncovers the new address.

Figure 9:
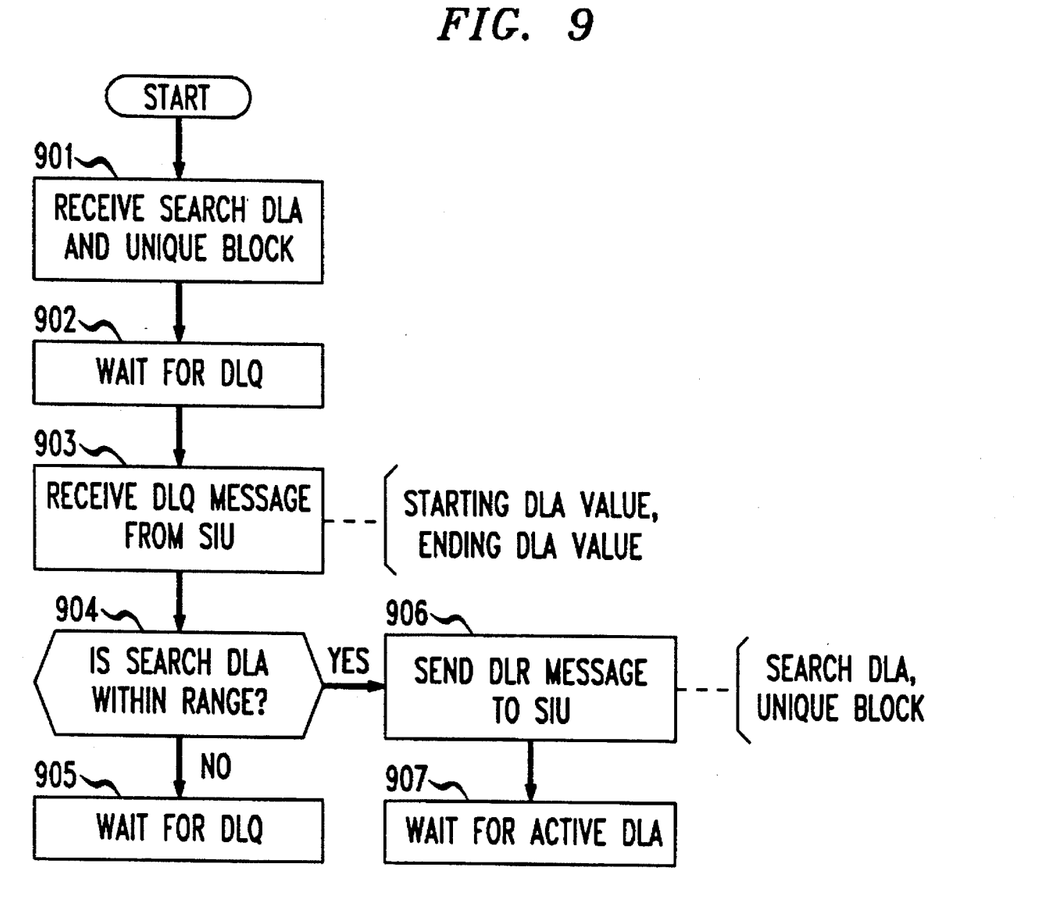
Figure 10:
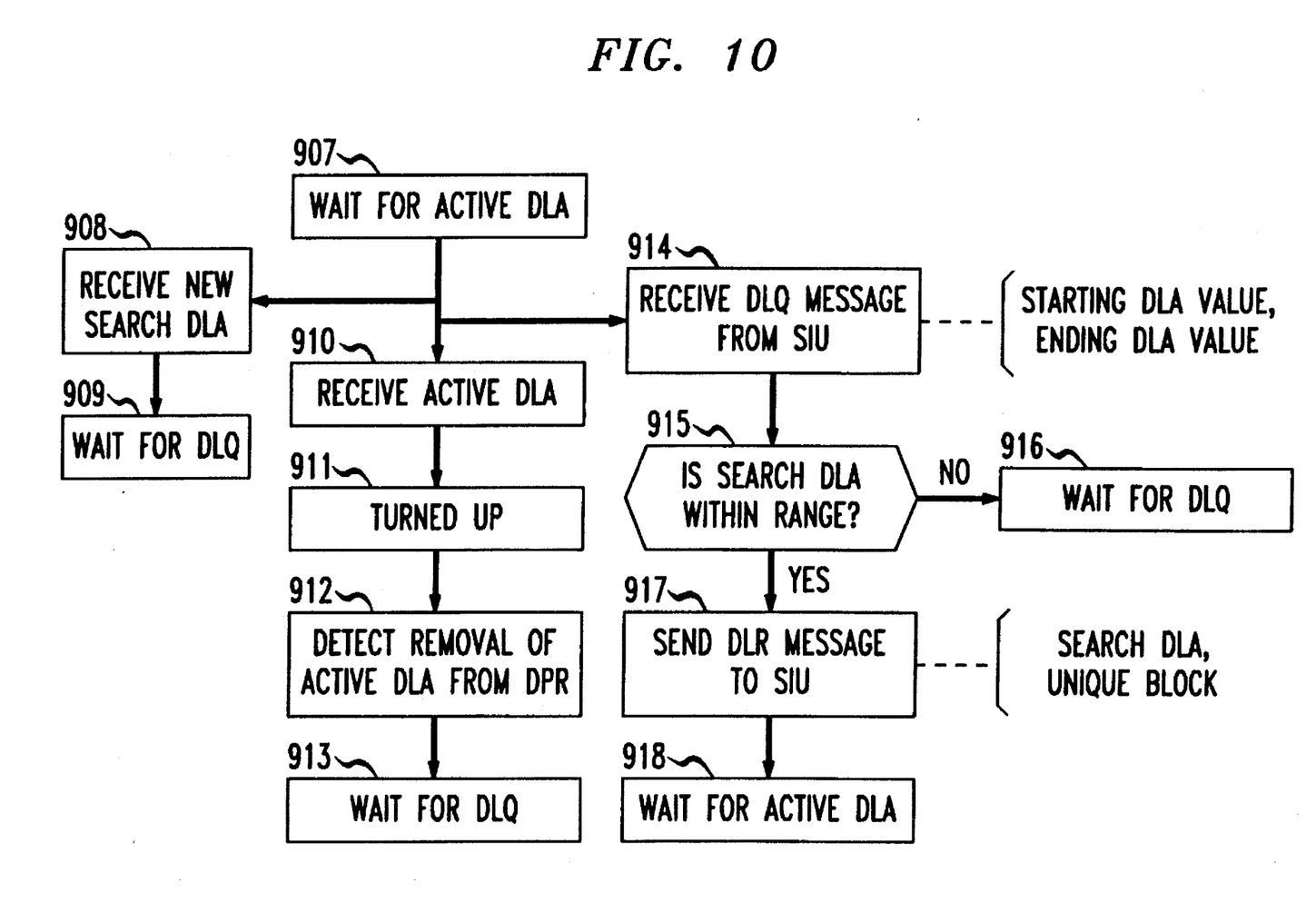

FIGS. 9–10 illustrate the steps performed by the microprocessor (21 of FIG. 2) which is part of the Alarm Display Unit. As indicated previously, and as shown in block 901, the microprocessor receives the search DLA and unique block which were written into the DPR (20 of FIG. 2) by the microprocessor (19 of FIG. 2) situated in the BCU. The microprocessor, 21, then waits for a data link address query (DLQ) from the SIU as indicated by block 902. When the message is received (block 903), it includes a range of DLA values (starting DLA value to ending DLA value). The microprocessor determines if the search DLA is within the range transmitted by the SIU (block 904). If it is not, the microprocessor waits for another DLQ (block 905). If the search DLA is within the transmitted range, the microprocessor sends a Data Link Reply (DLR) to the microprocessor (26 of FIG. 2) of the SIU, as indicated by block 906. As also indicated, the message also includes the search DLA of the BCU and its unique block. As shown in block 907, the slave microprocessor then waits for an active address (DLA) to be assigned by the master microprocessor (26).

Continuing the process in FIG. 10, the slave may receive a new search DLA from the BCU microprocessor (19), as shown by block 908, in the event that the SIU requests a new address (see blocks 606–613 of FIG. 7). In that event, the slave will wait for a later DLQ message (block 909). If the slave receives an active DLA from the SIU (block 910), the terminal will be turned up (block 911). The terminal will remain turned up until the ADU microprocessor (21) detects a removal of the active DLA from the DPR (20), as shown in block 912, in the event of a LAN reset or failure to receive an audit message (blocks 615 and 616 of FIG. 8). The slave will then wait for a later DLQ message (block 913). Alternatively, the slave may receive a retransmission of the DLQ message from the SIU (block 914) in the event that the SIU did not receive the previous DLR message from the BCU. As indicated, the message will include a range of DLA values (starting and ending DLAs). The slave will determine if the search DLA is within the range transmitted by the SIU (block 915). If it is not, the slave will wait for a later DLQ (block 916). If the slave's search DLA is within the transmitted range, the slave will send a reply (DLR) message to the SIU which includes the slave's search DLA and unique block (block 917). The slave then waits for an active DLA to be assigned by the SIU, as indicated by block 918.

It will be appreciated that once all terminals have been identified and assigned addresses, new searches will be conducted at periodic intervals to account for new terminals added to the network.

Various modifications of the invention will become apparent to those skilled in the art. All such variations which basically rely on the teachings through which the invention has advanced the art am properly considered within the scope of the invention.

We claim:

1. In a digital loop transmission system including a local area network comprising a plurality of remote terminals, each having a preset unique multi-byte serial number, and at least one master circuit in one of said terminals, a method for assigning addresses to said terminals comprising the steps of:

generating a search address by each of said terminals which search address has a lesser number of bytes than the serial number;

performing a binary search by the master circuit to determine the search address of each terminal wherein the master circuit sends a range of search addresses to remote terminals, each remote terminal with a search address within that range responds to the master circuit, and the master circuit divides the search range until it receives a single response from a remote terminal with a search address within the transmitted range; and assigning to each remote terminal by the master circuit an active address which is different from the search address and also has a lesser number of bytes than the serial number.

2. The method according to claim 1 wherein the serial number is 60-bytes in length and the search address is 16-bits in length.

3. The method according to claim 2 wherein the search addresses are randomly generated by a CRC calculation on the 60-byte serial number performed by microprocessors at the remote terminals.

4. The method according to claim 1 wherein each remote terminal's response includes its search address and its serial number.

5. The method according to claim 1 wherein the master circuit sends a turnup message to the single terminal responding, said message including the terminal's active address and its serial number.

6. The method according to claim 1 wherein the search address is generated by calculating the search address based on the unique serial number.

7. The method according to claim 6 wherein subsequent search addresses are randomly generated by a CRC calculation on the serial number ignoring the first byte of the serial number used in the previous calculation.

8. The method according to claim 1 wherein all the binary searches by the master circuit are directed initially to all the terminals.

9. Apparatus for assigning addresses to remote terminals in a digital loop transmission system including a local area network, each terminal having a preset unique multi-byte serial number, the apparatus comprising:

means for generating a search address by the remote terminal which search address has a lesser number of bytes than the serial number;

means for writing said search address at another location in said remote terminal; and means for receiving from a master circuit a range of search addresses having a lesser number of bytes than the serial number and for determining if the search address of the terminal is within said range.

10. Apparatus according to claim 9 further comprising:

means for receiving a turnup message from a master circuit at another remote terminal, said turnup message including an active address different from the search address and a unique serial number: and means for determining whether the received unique serial number corresponds to the unique serial number of the remote terminal.

11. Apparatus according to claim 9 further comprising means for receiving and storing said search address and unique serial number, and means for transmitting said address and serial number to a master circuit at another remote terminal.

12. Apparatus according to claim 9 wherein the means for generating a search address comprises means for calculating a search address based on the larger unique serial number.

13. Apparatus according to claim 9 wherein the means for generating the search address is part of a Bank Controller Unit.

14. Apparatus according to claim 13 wherein the means for generating comprises a microprocessor and an EPROM.

15. Apparatus according to claim 13 wherein the means for receiving the range and for determining if the search address is within the range is part of an Alarm Display Unit.

16. Apparatus according to claim 15 wherein said means for receiving and determining comprises a microprocessor and Dual Port RAM.

\* \* \* \* \*